United States Patent [19]

Kaylor

[11] Patent Number: 5,332,524
[45] Date of Patent: Jul. 26, 1994

[54] METHODS FOR DISSOLVING WATER SOLUBLE POLYMERS AND COMPOSITIONS USING SAME

[75] Inventor: Joseph B. Kaylor, Manassas, Va.

[73] Assignee: Valkyrie Scientific Proprietary, L.C., Manassas, Va.

[21] Appl. No.: 871,070

[22] Filed: Apr. 20, 1992

[51] Int. Cl.$^5$ .............................................. B01F 3/20
[52] U.S. Cl. .................. 252/363.5; 252/4; 252/6; 252/184; 526/932; 524/916
[58] Field of Search .............. 252/363.5, 3, 4, 5, 252/6; 524/916; 526/932

[56] References Cited

U.S. PATENT DOCUMENTS

| | | | |
|---|---|---|---|
| 2,807,591 | 9/1957 | Henry | 252/363.5 |
| 3,129,064 | 4/1964 | Harvey et al. | 23/267 |
| 3,147,955 | 9/1964 | Harvey et al. | 259/4 |
| 3,606,093 | 9/1971 | Morse et al. | 222/145 |
| 3,624,019 | 11/1971 | Anderson et al. | 260/29.6 R |
| 4,069,161 | 1/1978 | Pogers | 252/8.55 D |
| 4,537,513 | 8/1985 | Flesher et al. | 366/162 |
| 4,668,715 | 5/1987 | Phillips | 523/205 |
| 4,778,836 | 10/1988 | Farrar et al. | 524/35 |
| 4,846,582 | 7/1989 | Davidsson | 366/150 |
| 5,062,996 | 11/1991 | Kaylor | 252/610 |

OTHER PUBLICATIONS

"How to Dissolve POLYOX Water-Soluble Resins"; Union Carbide Bulletin F-42933; May, 1970.

*Primary Examiner*—Richard D. Lovering
*Assistant Examiner*—Joseph D. Anthony
*Attorney, Agent, or Firm*—Roland H. Shubert

[57] ABSTRACT

Particles of water soluble polymers such as poly(olefin oxides) are formulated to readily dissolve without agglomerating by associating polymer particles with particles of gas producing compounds, suitably a bicarbonate and an acid salt, which are non-reactive to the polymer but produce gas when wetted with water whereby the generated gas maintains polymer particles in separation as the particles dissolve.

19 Claims, No Drawings

METHODS FOR DISSOLVING WATER SOLUBLE POLYMERS AND COMPOSITIONS USING SAME

TECHNICAL FIELD

This invention relates to methods for formulating polymers in a manner which allows them to dissolve rapidly when mixed with water and to compositions employing those polymers.

Specific embodiments of this invention include polymer formulations which dissolve rapidly without agglomeration and clumping when added to water and to compositions employing those formulations to obtain solutions of the polymer and materials associated therewith.

BACKGROUND ART

A host of water soluble polymers, both synthetic and naturally occurring, have found extensive use in a variety of fields. Illustrative synthetic polymers include olefin oxide polymers such as poly(ethylene oxide) and copolymers of ethylene oxide with other lower olefin oxides such as propylene oxide, butylene oxide and the like, water soluble vinyl addition polymers such as the various acrylamide polymers, polyvinyl alcohol and many others. Naturally occurring water soluble polymers include a wide variety of plant-derived gums, resins, polysaccharides and the like.

Solutions of the polymers typically exhibit flocculating and thickening properties. Illustrative industrial applications include use as a flocculating agent in the clarification of aqueous solutions and suspensions as, for example, sewage and industrial wastes and in the secondary recovery of petroleum through water flooding. Certain of the high molecular weigh polymers, particularly high molecular weight poly(ethylene oxide), can reduce the turbulent frictional drag of water flowing through a conduit by as much as 80% at concentrations of a few parts per million. That effect is especially useful in fire fighting and similar applications wherein it is desired to deliver a large volume of water through a restricted conduit at a high rate.

It can be quite difficult to obtain a uniform water solution of many of the highly soluble polymers, particularly if the particles of the polymer are very small. As the polymer particles start to dissolve, a very concentrated and sticky solution forms around each particle. Contact of the partially dissolved particles, one with another, forms aggregates and lumps of polymer which resist dissolution. In almost all cases the simple addition of polymer particles to water, with or without stirring, results in agglomeration of the polymer particles into clumps which are then very difficult to dissolve.

A number of different approaches and techniques for dissolving water soluble polymers have been developed. For example, Union Carbide Corporation in its Brochure No. F-42933 entitled "How to Dissolve POLYOX Water Soluble Resins", describes three separate approaches or categories for the dissolving of poly(ethylene oxide) polymers. These are: 1. simple direct addition in water; 2. predispersion in water-miscible non-solvents; and 3. special mechanical methods to achieve dispersion with minimal shear.

Direct addition of powdered polymer to water requires stirring devices of proper design in order to obtain good dissolving. A paddle stirrer arranged to create a large vortex at a slow stirring rate is considered best for that use. High velocity stirring devices cannot be used effectively as the high shear produced by such devices causes extreme degradation of the polymers. The degradation effect is most severe with the higher molecular weight polymers.

Water-miscible non-solvents useful to predisperse poly(ethylene oxide) polymers for later dissolution include boiling water, concentrated salt or alkali solutions, and organic non-solvents. Poly(ethylene oxide) polymers are completely soluble in water until near the boiling point at which temperature they precipitate. Likewise, those polymers are insoluble in concentrated solutions of sodium hydroxide, sodium chloride, ammonium hydroxide and a variety of other salts. There are several water-miscible organic solvents in which poly(ethylene oxide) polymers are not soluble at room temperature. Those include, among others, anhydrous ethanol and isopropanol, certain glycols and acetone. After pre-dispersing the polymer particles in the non-solvent, water is added with mixing to form a solution.

A variety of mechanical devices have been developed for the batch and continuous dissolving of water soluble polymers. Apparatus specifically adapted for the dissolving of poly(ethylene oxide) polymers are illustrated by two patents to Harvey, et al, U.S. Pat. Nos. 3,129,064 and 3,147,955 and by another patent to Morse, et al, U.S. Pat. No. 3,606,093. The devices disclosed in those three patents disperse polymer particles onto a thin sheet of flowing water so as to avoid the agglomeration of the particles into gel lumps. Another mechanical device for dissolving polymers is illustrated in U.S. Pat. No. 4,846,582 to Davidsson. Polymer particles are introduced perpendicularly into a jet of water such that the particles are captured by the jet which is then projected against a surface causing the jet to change direction and break up into droplets. One more dissolving device is described in U.S. Pat. No. 4,537,513. Patentees first disperse polymer particles in a non-aqueous liquid and thereafter rapidly merge the polymer dispersion with a stream of water in an orifice mixer.

Yet another approach to dissolving water soluble polymers, specifically gels of polyacrylamide polymers, is described by Pogers in his U.S. Pat. No. 4,069,161. Pogers freezes the polymer gel and grinds it to form fine particles which are thereafter mixed with water. The frozen gel particles dissolve in the water as they thaw.

Finally, the Anderson patent, U.S. Pat. No. 3,624,019, discloses a technique for dissolving water soluble, vinyl addition polymers by first dispersing the polymers into a water-in-oil emulsion and then inverting the emulsion in water. Inversion of the emulsion causes the polymer to be released into the water to form a solution.

All of the prior art techniques for dissolving water soluble polymers require cumbersome apparatus or complicated techniques in order to obtain solutions. None of the methods or devices known in the prior art allows for the dissolving of polymers by simple addition of the polymer to water as one would do in the dissolving of salts and like compounds.

With this background, it can readily be appreciated that the formulation of water soluble polymers, particularly such polymers as poly(ethylene oxide) and polyacrylamides, in a manner which allows the preparation of aqueous polymer solutions by direct addition of the polymers to water provides an important advance in the art.

DISCLOSURE OF THE INVENTION

Particulate water soluble polymers are formulated in a way to render them readily soluble by simple addition to water without agglomeration of the polymer particles. That result is achieved by coating or otherwise intimately associating polymer particles with finely divided particles of one or more water soluble agents or compounds, suitably salts, which react or decompose to produce a gas upon contact with water. The gas produced by reaction or decomposition of the agent or compound acts to disperse and separate individual polymer particles thus allowing the polymer particles to dissolve in the water without agglomeration. Gas producing agents useful in the formulations of this invention include those which do not react with or otherwise degrade the polymers but which singly or in combination produce a gas upon contact with water such as, for example, combinations of a basic and an acidic salt which are stable as solids but which react in solution to form a gas.

Hence, it is an object of this invention to provide improved methods for dissolving water soluble polymers.

It is another object of this invention to provide formulations of water soluble polymers which dissolve upon simple mixing with water without agglomeration.

It is yet another object of this invention to provide novel compositions which include as a component thereof rapid dissolving formulations of water soluble polymers.

Other objects will be apparent from the following description of exemplary embodiments and uses.

MODES FOR CARRYING OUT THE INVENTION

Particles of water soluble polymers are coated by, or otherwise arranged in intimate association with, one or more water soluble agents, preferably salts, which do not react with the polymer and which produce a gas upon contact with water. The resulting particulate polymer formulations dissolve readily in water essentially without external agitation and without agglomeration as the gas released upon contact with water provides sufficient particle separation and agitation to allow dissolution of the polymer without agglomeration or clumping. Polymers useful in this invention may be either synthetic or naturally occurring and include olefin oxide polymers such as poly(ethylene oxide) and copolymers of ethylene oxide with other lower olefin oxides, water soluble vinyl addition polymers such as the various polyacrylamides, polysaccharides and the like. The polymer formulations may be added to water to obtain solutions or may be compounded with other materials to create a host of useful products including, for example, fire retarding, suppressing and extinguishing agents, sorbents to soak up and contain spilled hydrocarbons and chemicals, and leak stopping compositions.

It is common knowledge that certain compounds will, when wet with water, interact and decompose to release a gas. Such compounds and combinations of compounds are among those which are useful in preparing the polymer formulations of this invention. Probably the most widely known of such gas producing reactions is that of baking soda (sodium bicarbonate) which releases carbon dioxide when wetted with an acid. That reaction is utilized in ordinary baking powders which are mixtures of sodium bicarbonate with an acidic component. The acidic component is typically sodium tartrate, tartaric acid, anhydrous sodium aluminum sulfate, monocalcium phosphate or any combination thereof. So long as the mixture of sodium bicarbonate and acid salt is kept dry no reaction takes place but as soon as moisture is applied, carbon dioxide is freely liberated.

The bicarbonate and the acid salts used in baking powders necessarily are limited to those which can be ingested by humans without harm. However, for the purposes of this invention, compounds other than sodium bicarbonate, especially potassium bicarbonate, can often be used to advantage. Likewise, the acid salt used may be selected for properties other than its safety for human ingestion such as, for example, the use of monoammonium phosphate in fire retarding and extinguishing agents. Other agents, compounds or combinations of compounds other than bicarbonates and acidic salts may be used as well so long as the compound or compounds produce a gas when wetted with water and do not react with the polymer. Here is included mixtures of agents such as an active metal with a strong base, for example, aluminum or magnesium and sodium hydroxide, which react when wetted with water to release hydrogen gas. Also a single compound, for example a metallic nitride such as magnesium nitride, may be used as the gas producing moiety in the polymer formulation. The metallic nitride is hydrolyzed upon contact with water to produce gaseous ammonia.

Further, the polymer particles may be compounded solely with a basic agent and such formulations can be dissolved in accordance with this invention by wetting the formulation with a liquid acid to release a gas as occurs, for example, when baking soda is added to vinegar. Adding a polymer compounded solely with a basic agent to water alone results in some improvement in dissolving rate and ease as compared to addition of the polymer itself to water. That result can probably be attributed to the fact that the solubility of certain polymers decreases with an increase in pH. In addition to the bicarbonates, the alkali metal or alkaline earth metal carbonates such as sodium or calcium carbonate, will react with an acid solution to release carbon dioxide and such compounds may also find use in the formulations of this invention.

The fast dissolving polymer formulations of this invention may conveniently be prepared using conventional mixing and blending equipment. Polymer particles may be coated or otherwise intimately associated with particles of gas producing agents by adding the agents to the polymer particles and tumble mixing as in a conventional double cone or V-blender. It is desirable but not essential that the particle size of the gas producing agents be as small as or smaller than the polymer particles so as to obtain as intimate association as possible between the polymer particles and those of the agent. When using combinations of compounds as the gas producing agent, as for example a bicarbonate and an acid salt, it is usually desirable to coat or associate the polymer particles with the gas producing compounds in a sequential fashion rather than as a mixture. That is to say one of the gas producing compounds is added to the polymer particles and tumble mixed to form particulates comprising one or more polymer particles coated with or otherwise intimately associated with one or more particles of the gas producing compound. Misting of a minute amount of water during the mixing is sometimes advantageous as it promotes adherence of the compound particles to the particles of polymer. Thereafter, the other compound is added to the particulates and is mixed by tumbling or other suitable technique to obtain a particulate polymer formulation comprising polymer particles having a first coat or layer of one gas producing compound and a second coat or layer of another gas producing compound. The particle size of the finished formulation will typically be about that of ordinary table salt.

It is preferred that the basic salt, as for example the bicarbonate, is made the first coating or layer on or associated with the polymer particles. The acid salt is then added to the polymer-basic salt particulates and is mixed to form the exterior coat or layer. Such formulations, particularly those employing poly(ethylene oxide) polymers, display superior dissolving performance as compared to formulations in which the acid moiety is made the first layer with the polymer particles. It is known that poly(ethylene oxide) polymers are quite insoluble in alkali solutions and that effect may account for the difference in result.

The ratio of gas producing agent to polymer is not at all critical so long as the amount of gas produced by the agent is sufficient to prevent agglomeration or clumping of polymer particles during their dissolution. The minimum amount of gas producing agent required to prevent polymer agglomeration upon contact with water depends to some extent upon the agent and may be determined by routine experimentation. When using a combination of a bicarbonate and an acid salt as the gas producing agent, for example, the weight ratio of bicarbonate to polymer may range broadly from about 0.01 to 10 with a more preferred ratio being about 0.05 to 2. It is ordinarily preferred but not required that the amount of acid salt included in the formulation be such that the bicarbonate and acid salt react to a reasonable completeness without leaving a significant excess of either. Stoichiometric balance between the bicarbonate and the acid salt provides the most efficient use of the two compounds for gas production and results in the least change to the pH of the solution.

The rapid dissolving polymer formulations of this invention find immediate use for the preparation of polymer solutions. Such polymer solutions are routinely employed for a host of purposes including, for example: as a drag-reducing additive to increase the flow of water through a conduit; as a thickener for paints and personal care products; as a thickener for petroleum drilling muds and tertiary oil recovery fluids; and as a flocculent for industrial waste waters. Solutions of desired concentration may be prepared simply by pouring the requisite amount of polymer formulation into a container of water. Dissolving will take place without agglomeration, gel formation, or clumping. Stirring is ordinarily not necessary except to ensure homogeneity of the solution. However, the rate of dissolving may be hastened by agitation or by stirring with a paddle or spoon much as one would do in dissolving salt or sugar in water. It is ordinarily possible to select the gas producing salts used to so as to not affect the end use of the solution. For example, were the polymer solution to be employed for food use, the gas producing compounds selected would appropriately be those used in baking powders. On the other hand, were the solution to be used for fire inhibiting or extinguishing purposes, a combination of compounds having superior fire extinguishing properties, such as potassium bicarbonate and monoammonium phosphate, might advantageously be selected.

The polymer formulations also find immediate use as adjuncts to certain of those fire extinguishing compositions disclosed in the inventor's prior U.S. Pat. No. 5,053,147, the disclosure of which is incorporated by reference herein. For example, addition of poly(ethylene oxide) polymer formulations prepared using a combination of fire extinguishing agents such as potassium bicarbonate and monoammonium phosphate to foam-applied fire extinguishing compositions set out in U.S. Pat. No. 5,053,147 provides significant advantage. The delivery rate and the throw distance of the water foam are increased by reduction of the turbulent frictional drag of the water and the foam bubbles are strengthened by the polymer. A minor portion of the polymer formulation of this invention is intimately mixed with a major portion of an extinguishing composition such as those disclosed in the inventor's prior patent. Those compositions comprise generally a combustible, high molecular weight, thermoplastic polymer which is soluble in hydrocarbons. Individual polymer particles are arranged in intimate association with a sufficient quantity of a dry chemical fire extinguishing agent to protect the particles during transit through a flame and onto the surface of a burning material. Upon striking the surface of a burning liquid hydrocarbon, the polymer dissolves in the liquid causing it to thicken and concentrating fire extinguishing agents on the liquid surface. Extinguishing agents appropriate for use include alkali metal bicarbonates, alkali metal halides, alkaline earth metal carbonates, ammonium phosphates and addition products of urea with alkali metal bicarbonates, used singly or in combination.

The polymer formulation containing a water soluble polymer typically will make up from about 0.2% to about 10% by weight of the total fire extinguishing composition. It is also advantageous to add to the mixed composition a minor amount, on the order of a percent or so, of a film-forming synthetic detergent such as a fluorosurfactant taking care to ensure that the surfactant is totally non-reactive toward the components of the mixed composition.

In one preferred embodiment, single charges of the mixed composition fire extinguishing agent are packaged in water soluble bags. Those bags may be fabricated from films of a water soluble polymer such as polyvinyl alcohol or poly(ethylene oxide). Each bag contains an amount of extinguishing agent that, when added to water, makes up a single charge for a standard fire extinguisher. For most uses, a single charge will produce a concentration of mixed composition agent in water of about 1% to about 10%. In use, a fire extinguisher is charged by filling it with water, dropping in the bag containing the charge, closing the extinguisher and pressurizing it for use. The extinguisher may be internally pressurized by reaction of certain of the fire extinguishing agents present in the charge to generate a gas or it may be pressurized from an external source. Alternatively, the mixed composition fire extinguishing agents may be inducted directly into the water stream being directed onto a fire.

Similarly polymer formulations of this invention, when used as a component of those sorbent compositions set out in U.S. Pat. No. 5,062,996, enhance the fire-safe properties of the liquid-loaded sorbent. In that instance, the polymer formulations of this invention are employed as a substitute for the second, water soluble polymer used in certain of the sorbent compositions of the prior patent.

Polymer formulations prepared according to this invention also find use in the preparation of other new products. One such product comprises cleaning agents which have been found to be especially effective for the cleaning of tanks, pavement, fibers and other surfaces and the removal of hydrocarbons such as oil, grease, asphalt and the like therefrom. Such cleaning agents usefully employ a second polymer in addition to the poly(ethylene oxide) or other water soluble polymer contained in the polymer formulation. The second polymer is selected from that group of polymers which swell upon contact with water to form a gel and includes such exemplary polymers as the alkali metal salts of polyacrylic acid, especially potassium polyacrylate. The swellable polymer is preferably in the form of a fine powder and may be comminuted if necessary to obtain appropriate size reduction. A quantity of polymer formulation prepared according to the teachings of this invention is thoroughly blended and mixed with the finely divided swellable polymer in a weight ratio ranging from about 1 to 100 parts of the swellable polymer per 10 parts of polymer formulation. To that mixture is then added a minor amount of one or more surfactants which may be either of the ionic or non-ionic type. Particularly preferred surfactants include those containing amine or amide functional groups as, for example, alkanolamides. The resulting cleaning composition is effective when mixed with water to clean oil and grease from concrete surfaces, to clean the interior of tanks contaminated with hydrocarbon residues, and for other similar uses. A small amount of a non-aqueous solvent such as a petroleum naphtha may also be incorporated into the cleaning composition before it is mixed with water.

The cleaning composition described above may also be employed as a base for a dual action, Class A and Class B, fire extinguishing foam concentrate. A Class A foam is one appropriate for use on fires of materials of Class A composition such as wood, paper, fabrics, tires, plastics and the like. A Class B foam is formulated for use on Class B materials such as flammable liquids and usually includes either AFFF or protein as a base for the foam. As the term is used in the art, "AFFF" designates those materials known as aqueous film forming foams. Such foams usually employ a fluorosurfactant as the film forming agent. Ordinarily, a Class A foam cannot be used on a Class B fire nor is a Class B foam particularly effective on a Class A fire. The dual action foam includes as essential components a water swellable polymer, a rapid dissolving water soluble polymer formulated in accordance with this invention, at least two dry chemical fire extinguishing agents, one or more foaming agents, a wetting agent for Class A materials, and a film-forming surfactant. Proportions of the components for the dual action foam can vary over a considerable range but good results are obtained if the weight percent of each of the essential components is within the following ranges: water swellable polymer, 5%–40%; water soluble polymer (exclusive of the gas producing compounds associated with the polymer particles), 2%–10%; dry chemical fire extinguishing agents (including gas producing compounds associated with the water soluble polymer), 20%–75%; foaming agents, 0.1% –5%; wetting agent for Class A materials, 0.1% –10%, and film forming surfactant, 0.1% –3%. A preferred gelling, or swellable, polymer is potassium polyacrylate while poly(ethylene oxide) is preferred as the water soluble polymer. It is advantageous to employ fire extinguishing agents, particularly a combination of an alkali metal bicarbonate and monoammonium phosphate, as the gas producing compounds associated with the water soluble polymer. Other dry chemical fire extinguishing agents which may be used in the dual action foam include those conventionally used for that purpose including potassium chloride, other ammonium phosphates, addition products of urea with potassium bicarbonate, and the like. The foaming agent may be any of those ordinarily used in the art for that purpose. Appropriate wetting agents for Class A materials include common detergents such as that marketed under the tradename TIDE and the like. The film-forming surfactant preferably is a concentrate of those compositions referred to in the art as AFFF foams and includes one or more fluoro-surfactants.

In use the dual action foam is dissolved in and diluted with water, either batch wise or continuously, to a concentration typically ranging from about 0.5% to 6% and is applied directly to the burning materials. When the foam is used batch wise it may be packaged in water soluble bags making up a single charge for a standard fire extinguisher in the manner previously described. The foam clings to and covers surfaces of Class A materials, even vertical surfaces, by virtue of its high viscosity which is imparted by the water soluble polymer. When applied to the surface of a Class B material, such as a burning hydrocarbon liquid, the foam forms a cap atop the hydrocarbon with foamed agglomerates and particles of the swellable polymer riding on a film surface formed by the film forming surfactant. The film forming surfactant, AFFF or the like, functions to spread the foam rapidly across the hydrocarbon surface while the swellable polymer appears to give strength and persistence to the foam layer.

Further, those described polymer formulations which include two polymers, a first water soluble polymer such as poly(ethylene oxide) and a second water swellable polymer such as potassium polyacrylate, are usefully employed as a component in sorbent compositions to soak up and contain spilled liquids. Such sorbent compositions may usefully comprise from about 5% to about 25% by weight of the polymer formulation with the remainder being organic and inorganic absorbent solids, wicking agents, neutralizing agents, fire extinguishing agents and the like. The resulting sorbent compositions are useful to soak up and contain organic liquids such as fuels and solvents and may be used as well to soak up polar solvents and aqueous liquids including solutions of the common mineral acids. The polymers act to contain the sorbed liquid and to bind liquid-wetted particles of absorbent solid together for easy clean-up.

The polymer formulations of this invention can also be used to advantage in the preparation of sealing or leak plugging compositions. The compositions so obtained are useful for plugging leaking containers or tanks, such as vehicle fuel tanks, containing gasoline, jet fuel or other hydrocarbons on a semi-permanent basis. In this instance the polymer formulation is compounded with particles of an oil soluble polymer, such as a rubber, which will dissolve in hydrocarbons to form a thick gel. A wicking agent, such as powdered polypropylene, is also necessary in order to provide rapid penetration of hydrocarbon into the leak plugging composition. The polymer formulation of this invention is mixed with particles of oil soluble polymer and the wicking agent and is formed into a homogeneous powder by addition of minor amounts of a solvent and surfactant.

The particles of the oil soluble polymer are processed in the manner described in the inventor's prior U.S. Pat. No. 5,053,147 by shredding or grinding a rubber or other suitable polymer to relatively small, discrete particles and coating the particles to prevent their agglomeration. Rubbers appropriate for use in the composition include synthetic rubbers such as polyisobutylene having a relatively high molecular weight; 2 million or more. The comminuted rubber particles may be coated with any of the known anti-agglomerating agents used for that purpose. It has been found that the alkali metal salts of long chain fatty acids such as calcium or magnesium stearate work well for that purpose.

As has been set out previously, the components of leak plugging compositions include an oil soluble polymer, a wicking agent, a polymer formulation including a water soluble polymer, a solvent and a surfactant. For every 100 parts by weight of rubber (coated with an anti-agglomerating agent) there is used 20 to 100 parts of wicking agent. Those two components are thoroughly mixed together as by tumbling. Optionally, up to about 15 parts of a hydrocarbon soluble compound such as a simple carbohydrate may be added to the rubber and wicking agent. Thereafter a solvent, which may be a petroleum naphtha or the like, is mixed with a surfactant in an amount such as to provide about 0.1 to 1 parts surfactant per 100 parts of rubber in the final composition. A minor amount of the polymer formulation, enough to provide about 0.01 to 1 parts of polymer formulation to 100 parts of rubber, is thoroughly mixed with the solvent and surfactant. That solvent-surfactant-polymer formulation mixture is gradually added to the rubber and wicking agent with continuous mixing to obtain a blended, free flowing powder which is the leak plugging composition. In use, the plugging composition is pressed into and around a leak. Hydrocarbon immediately penetrates the composition causing partial dissolving and swelling of the rubber particles to produce a plug having sufficient physical strength and integrity to prevent further leakage.

Specific examples of the invention are set out below. The examples are illustrative and are not meant to limit the scope of the invention in any way.

EXAMPLE 1

A rapid dissolving polymer formulation was prepared from a quantity of POLYOX Grade WSR-303 obtained from Union Carbide Corporation. POLYOX WSR-303 is, according to the manufacturer's literature, a nonionic water-soluble poly(ethylene oxide) polymer having a molecular weight of about 7 million.

A quantity of the WSR-303 polymer was placed in a double-cone laboratory blender along with an equal weight quantity of potassium bicarbonate powder and mixing was continued until a homogeneous particulate blend or overcoating of the bicarbonate on the polymer was obtained. Thereafter, a quantity of monoammonium phosphate in an amount calculated to stoichiometrically react with the bicarbonate was added to the particulate blend of polymer and bicarbonate and mixing was continued until a second homogeneous particulate blend, as determined by visual observation, was obtained. That second homogeneous blend comprised particulates of polymer and bicarbonate overcoated with monoammonium phosphate and constitutes an example of a polymer formulation according to this invention.

A sample of the polymer formulation thus produced was placed in the bottom of a graduated cylinder and the cylinder was then filled with water. Bubbling and movement of the layer of polymer formulation resting at the bottom of the cylinder was observed. The formulation dissolved completely within a few minutes without stirring or agitation. In another test, a beaker was filled nearly to the top with water and was stirred by hand while polymer formulation was dusted onto the surface of the water. The particles of polymer formulation dissolved almost instantly to quickly form a thick, viscous solution. Those two tests were repeated using WSR-303 in the form it was received from the manufacturer. In both instances, the polymer particles agglomerated to form a sticky mass which then was extremely difficult to dissolve.

EXAMPLE 2

The procedure of Example 1 was repeated except that the poly(ethylene oxide) polymer, the potassium bicarbonate, and the monoammonium phosphate were all added to the blender and simultaneously mixed together. The resulting composition when added to water was superior in dissolving behaviour to the pure polymer particles but was far more difficult to dissolve than was the formulation of Example 1. Other experiments showed that the sequential application of gas producing compounds to the polymer to thereby obtain a layered particulate with the particles of a basic salt arranged in closer proximity to polymer particles than are particles of an acid salt enhanced the dissolving process. Dissolution was speeded and agglomeration was dramatically reduced.

EXAMPLE 3

The procedure of Example 1 was repeated except that the amount of basic salt, again potassium bicarbonate, which was used was reduced to 7.5% of the pollfiner weight. An acid salt, again a stoichiometric quantity of monoammonium phosphate, was used to overcoat the polymer-bicarbonate particulates. The resulting polymer formulation dissolved readily in water without clumping or agglomeration.

EXAMPLE 4

Granules of a water swellable polymer, in this case potassium polyacrylate, were finely ground in a rotating blade comminutor. That finely ground swellable polymer was mixed with the polymer formulation of Example 3 in various weight ratios ranging from 1:9 to 9:1. To those mixtures was added in turn a minor amount of surfactant. The resulting compositions were found to be very effective cleaning compounds particularly for the removal of hydrocarbons from surfaces such as the removal of grease and oil from concrete floors and pavement. The properties of the compositions may readily be tailored to a particular use by varying the ratios of the components and the type and amount of surfactant used.

EXAMPLE 5

Those polymer admixtures of Example 4 comprising finely ground potassium polyacrylate mixed with the polymer formulations of Example 3 were used in the formulation of absorbent compositions for soaking up spilled contaminant liquids. A minor amount of the polymer admixture, ranging from about 5% to 25% of the total composition by weight, was compounded with an organic absorbent solid and acidic and basic salts. The acidic and basic salts were those commonly employed as fire extinguishing agents and included alkali metal carbonates and bicarbonates and monoammonium phosphate. The resulting sorbent composition proved useful in soaking up organic liquids such as gasoline and for soaking up and neutralizing solutions of mineral acids. The acidic and basic salts served a dual function; that of neutralizing acids or bases sorbed by the composition and that of rendering sorbed flammable liquids relatively fire safe. Further, the polymers inhibited bleed of the sorbed liquids and served to bond the absorbent particles together.

The rapid dissolving polymer formulations described herein may be mixed with water to obtain solutions of desired concentration for any conventional use and may be employed as a component in any product in which the properties of the polymer prove useful.

I claim:

1. A particulate polymer formulation comprising particles of a water soluble polymer selected from the group consisting of poly(olefin oxides), vinyl addition polymers, and copolymers and mixtures thereof arranged in intimate association with particles of at least two other compounds, said other compounds being non-reactive toward said polymer but reacting to produce a gas upon being wetted with water, one of said other compounds being basic and another of said compounds being acidic, the particles of said basic compound arranged as a first layer on and in closer proximity to said polymer particles than are particles of said acidic compound, the particles of said acidic compound arranged as a second layer exterior to said first layer, said polymer formulation characterized by readily dissolving without agglomeration when contacted with water.

2. The composition of claim 1 wherein said polymer is poly(ethylene oxide).

3. The composition of claim 1 wherein one of said compounds is a basic salt and another of said compounds is an acid salt.

4. The composition of claim 3 wherein the weight ratio of said basic salt to said polymer ranges from about 0.05 to 2.

5. The composition of claim 4 wherein said basic salt is an alkali metal bicarbonate and wherein the amount of said acid salt in said composition is such that the reaction between the bicarbonate and acid salt goes to completion without leaving a large excess of either compound.

6. A method for dissolving a water soluble, poly(olefin oxide) polymer comprising generating a gas around and between polymer particles as said particles are wetted with water while simultaneously creating an alkaline environment around individual polymer particles, said gas generation produced by the reaction of a basic compound with an acid, said alkaline environment created by arranging particles of said basic compound as a first layer around said polymer particles, the amount of gas generated being sufficient to prevent agglomeration of the polymer particles as they dissolve.

7. The method of claim 6 wherein said polymer is poly(ethylene oxide).

8. The method of claim 6 wherein said basic compound is a bicarbonate, wherein said acid is derived from a particulate acidic compound, and wherein particles of said acidic compound are arranged as a second layer exterior to said first layer to form reactive particulates, said basic compound being non-reactive toward said polymer.

9. The method of claim 8 wherein said basic compound is an alkali metal bicarbonate and wherein said acidic compound is an acid salt.

10. A method for preparing a particulate, rapid dissolving formulation of a water soluble polymer comprising adding to a finely divided polymer, selected from the group consisting of poly(olefin oxides), vinyl addition polymers, and copolymers and mixtures thereof, at least two other particulate compounds, a first said compound being basic and another of said compounds being acidic, said other compounds being non-reactive toward said polymer but reacting to produce a gas upon being wetted with water, mixing said polymer and said first compound together to form particulates comprising polymer particles arranged in intimate association with particles of said first compound to form polymer particles having a layer of said first compound particles thereon and to obtain a first composite, particulate formulation, and thereafter mixing said first composite formulation with said acidic compound to obtain a second, layered, composite formulation having particles of said acidic compound arranged as a second layer exterior to said first particulate formulation, said second formulation characterized by readily dissolving without agglomeration when contacted with water.

11. The method of claim 10 wherein said polymer is a polyacrylamide.

12. The method of claim 10 wherein said polymer is a poly(olefin oxide), wherein said basic compound is an alkali metal bicarbonate and wherein said acidic compound is an acid salt.

13. The method of claim 12 wherein said polymer is a high molecular weight poly(ethylene oxide).

14. A particulate polymer composition comprising in admixture;

a first, particulate water soluble polymer selected from the group consisting of poly(olefin oxides), vinyl addition polymers, and copolymers and mixtures thereof, the particles of said water soluble polymer arranged in intimate association with particles of at least two other compounds; said compounds being non-reactive toward said polymer and non-reactive toward each other when dry but reacting one with the other to produce a gas when wetted with water, one of said other compounds being basic and another of said compounds being acidic, the particles of said basic compound arranged in closer proximity to said polymer particles than are particles of said acidic compound to form a composite comprising particles of said basic compound arranged as a first layer around said polymer particles with particles of said acidic compound arranged as a second layer exterior to said first layer; and a second, finely divided, water-swellable polymer in a weight amount ranging from 1 to 100 parts per 10 parts of said water soluble polymer.

15. A polymer composition of claim 14 wherein said water soluble polymer is a poly(olefin oxide), wherein said water-swellable polymer is an alkali metal salt of polyacrylic acid, and including a surfactant in an amount less than that of either said water soluble polymer or said water-swellable polymer.

16. The composition of claim 15 wherein said poly(olefin oxide) is poly(ethylene oxide) and wherein said water-swellable polymer is potassium polyacrylate.

17. The composition of claim 15 including a minor amount of a non-aqueous solvent.

18. The composition of claim 14 including one or more non-polymeric absorbent solids in major amounts.

19. The composition of claim 18 including at least one additional compound, other than said basic compound and said acidic compound, having fire extinguishing activity and wherein at least one of said non-polymeric absorbent solids is an organic absorbent.

* * * * *